(12) United States Patent
Campbell et al.

(10) Patent No.: US 7,989,070 B2
(45) Date of Patent: Aug. 2, 2011

(54) COATING COMPOSITION FOR ACHIEVING EXCELLENT MVSS ADHESION

(75) Inventors: Donald H. Campbell, Hartland, MI (US); Gregory G. Menovcik, Northville, MI (US); Timothy S. December, Rochester Hills, MI (US)

(73) Assignee: BASF Coatings GmbH, Muenster (DE)

( * ) Notice: Subject to any disclaimer, the term of this patent is extended or adjusted under 35 U.S.C. 154(b) by 384 days.

(21) Appl. No.: 11/960,815

(22) Filed: Dec. 20, 2007

(65) Prior Publication Data

US 2009/0162646 A1 Jun. 25, 2009

(51) Int. Cl.
*C08G 18/32* (2006.01)

(52) U.S. Cl. .............. 428/413; 428/423.1; 428/520; 526/301; 525/438

(58) Field of Classification Search ........... 428/520, 428/413, 423.1; 526/301; 525/438
See application file for complete search history.

(56) References Cited

U.S. PATENT DOCUMENTS

| | | | |
|---|---|---|---|
| 5,356,669 A | 10/1994 | Rehfuss et al. | |
| 5,530,154 A | 6/1996 | Seifert et al. | |
| 5,639,828 A | 6/1997 | Briggs et al. | |
| 5,814,410 A | 9/1998 | Singer et al. | |
| 5,898,052 A | 4/1999 | Okumura et al. | |
| 5,976,615 A | 11/1999 | Menovcik et al. | |
| 5,989,642 A | 11/1999 | Singer et al. | |
| 6,103,816 A | 8/2000 | Swarup et al. | |
| 6,331,596 B1 | 12/2001 | Ramesh et al. | |
| 6,380,323 B1 | 4/2002 | December | |
| 6,462,144 B1 * | 10/2002 | Ramesh et al. | 525/438 |
| 6,531,560 B1 * | 3/2003 | Campbell et al. | 526/301 |
| 6,624,279 B2 | 9/2003 | Ohrbom et al. | |
| 6,649,734 B2 | 11/2003 | Campbell et al. | |
| 6,652,919 B1 * | 11/2003 | Campbell et al. | 427/407.1 |
| 6,657,007 B2 * | 12/2003 | Gilbert et al. | 525/124 |
| 6,696,159 B2 * | 2/2004 | Campbell et al. | 428/423.1 |
| 6,696,535 B2 * | 2/2004 | Campbell et al. | 526/301 |
| 6,855,789 B2 * | 2/2005 | Campbell et al. | 526/301 |
| 6,858,693 B2 * | 2/2005 | Campbell et al. | 526/301 |
| 6,890,994 B2 * | 5/2005 | Ohrbom et al. | 525/242 |
| 6,995,208 B2 | 2/2006 | Mehta et al. | |
| 2002/0119320 A1 | 8/2002 | Ramesh et al. | |
| 2002/0153507 A1 | 10/2002 | Savino et al. | |

OTHER PUBLICATIONS

PCT International Search Report for PCT/US2008/012802 dated Feb. 26, 2009, 3 pages.
"CYMEL Amino Resin Crosslinkers for the Coating Industry", Cytec Industries, Inc., 2008, 42 pages.

* cited by examiner

*Primary Examiner* — Leszek Kiliman
(74) *Attorney, Agent, or Firm* — Howard & Howard Attorneys PLLC

(57) ABSTRACT

A coating composition comprises a crosslinkable carbamate-functional resin and an aminoplast. The aminoplast comprises the reaction product of an aldehyde and a melamine. The aminoplast has a content of imino groups of less than or equal to about 10%, a content of alkylol groups of at least about 7%, and a remainder of groups being alkoxyalkyl groups, all based on a total number of reactive sites present in the melamine prior to reaction. A coating system includes a clear coat layer that comprises the reaction product of the crosslinkable carbamate-functional resin and the aminoplast. Threshold adhesion strength, in accordance with MVSS standards, can be achieved between glass and the coating system when the crosslinkable carbamate-functional resin and the specific aminoplast set forth above are reacted to form the clear coat layer, while minimizing problems associated with high viscosity of aminoplasts having a high content of imino groups of greater than 10%.

25 Claims, No Drawings

COATING COMPOSITION FOR ACHIEVING EXCELLENT MVSS ADHESION

BACKGROUND OF THE INVENTION

1. Field of the Invention

The present invention generally relates to a coating composition and a coating system including a clear coat layer formed from the coating composition. More specifically, the present invention relates to a coating composition that enables threshold adhesion strength to be achieved between glass and a substrate bonded through the coating system.

2. Description of the Related Art

Bonding of stationary glass, such as a windshield, to a vehicle body during a vehicle assembly process presents many quality and safety issues to automotive manufacturers. For example, motor vehicle safety standards (MVSS), such as MVSS 212, require a threshold adhesion strength between glass and vehicle bodies for ensuring that the glass remains bonded to the vehicle body, especially in the event of a crash or rollover situation, to minimize the incidence of injury to passengers of the vehicle resulting from detachment of the glass from the vehicle body. In fact, in crash and roll-over situations, the glass may provide additional support to a roof of the vehicle and may thereby help to prevent injuries resulting from compaction of the roof of the vehicle. Therefore, the glass preferably remains bonded to the vehicle body.

During the vehicle assembly process, a coating system is formed on the vehicle body prior to the point in the process at which the glass is bonded to the vehicle body. The coating system typically includes a clear coat layer, a base coat layer, and other sub-clear coat layers that are known in the art. The glass is bonded to the coating system of the vehicle body via a sealant that is typically applied in the form of a bead to the clear coat layer. Thus, the adhesion strength between the glass and the vehicle body is dependent upon the interaction between the sealant and the clear coat layer within the coating system.

Many factors may contribute to the robustness of the bond between the glass and the vehicle body, including the formulation of the sealant, the formulation of the clear coat layer, base coat layer, and other sub-clear coat layer(s) within the coating system on the vehicle body and inter-layer adhesion between those layers, compatibility of the formulations used for the sealant, the clear coat layer, the base coat layer, and the sub-clear coat layer(s) within the coating system, film build of the clear coat layer, the base coat layer, and other sub-clear coat layer(s) within the coating system, and the ability of the clear coat layer, base coat layer, and other sub-clear coat layer(s) in the coating system to cure at lower than normal times and temperatures.

While numerous methods of achieving the threshold adhesion strength have been used in the past, satisfaction of the adhesion strength thresholds has generally been accompanied by detrimental effects to the aesthetic qualities (e.g. appearance) and/or physical properties of the coating system or has required manual application of a reactive primer or a tape masking between the clear coat layer and the sealant.

Coating compositions that are used to form the clear coat layers are generally formulated based on a desire to achieve certain aesthetic qualities and/or physical properties in the resulting coating system, such as acceptable appearance, durability, resistance to scratching and degradation due to UV light, environmental etching, etc. For example, crosslinkable carbamate-functional polymers have been found to provide particularly desirable properties to the coating system in terms of resistance to environmental etching. Such crosslinkable carbamate-functional polymers are known in the art.

One strategy that has been used in the past to maximize the adhesion strength between the glass and the vehicle bodies has been to modify the coating compositions used to form the clear coat layer or to add additional additives into the coating compositions to provide functional groups for reacting with the sealant. The coating compositions are sensitive to modification or addition of additives, which may negatively impact one or more of the aesthetic qualities of the resulting clear coat layer. The effect of the additives or modifications on the coating composition is unpredictable and varies depending upon the type of coating composition. Modification of the coating composition or addition of additives may also affect the ability of the coating composition to satisfy low temperature cure requirements, thereby possibly resulting in a higher incidence of off-specification coating systems.

With regard to the manual application of the reactive primer between the sealant and the clear coat layer, known reactive primers have reactive groups that react with the sealant and the clear coat layer, and much care must be taken to avoid application of the reactive primer onto the clear coat layer outside of specific regions on the vehicle body where the glass is to be bonded. Automated application of the reactive primer is generally not feasible, and laborers are typically required to apply the reactive primer, thus adding cost and time to the vehicle assembly process.

While it is well known to use crosslinking agents in the coating compositions, there are drawbacks associated with certain crosslinking agents that are known for use in the coating compositions used to form the clear coat layer and that are known to result in threshold adhesion strength between the glass and the vehicle bodies. Such crosslinking agents include aminoplasts having a high content of imino groups of greater than 10% based on a total number of reactive sites present in a melamine used to form the aminoplast prior to reaction. While the aminoplasts having the high content of amino groups may help coating systems to achieve threshold adhesion strength between glass and a substrate bonded through the coating systems, the aminoplasts having the high content of imino groups present difficulties with regard to balancing viscosity of the coating composition with VOC levels and solids levels within the coating composition.

In view of the foregoing, there is a desire within the automotive and coatings industries to provide solutions to the problems associated with bonding stationary glass to coating systems, especially coating systems having a clear coat layer formed from carbamate-functional resins. More specifically, there is a desire to achieve threshold adhesion strength, in accordance with MVSS standards, between the glass and the vehicle bodies while minimizing detrimental effects to the aesthetic qualities of the coating system and while minimizing problems associated with high viscosity of aminoplasts having a high content of imino groups of greater than 10%.

SUMMARY OF THE INVENTION AND ADVANTAGES

The subject invention provides a coating composition and a coating system including a clear coat layer and, optionally, at least one sub-clear coat layer. The coating composition comprises a crosslinkable carbamate-functional resin and an aminoplast. The aminoplast comprises the reaction product of an aldehyde and a melamine. The aminoplast has a content of imino groups of less than or equal to about 10%, a content of alkylol groups of at least about 7%, and a remainder of groups being alkoxyalkyl groups, all based on a total number of reactive sites present in the melamine prior to reaction.

The clear coat layer comprises the reaction product of the crosslinkable carbamate-functional resin and the aminoplast. The optional sub-clear coat layer(s) comprises the reaction product of a sub-clear coat resin and a second crosslinking agent.

Threshold adhesion strength, in accordance with MVSS standards, can be achieved between glass and a substrate that are bonded through the coating system when the crosslinkable carbamate-functional resin and the specific aminoplast set forth above are reacted to form the clear coat layer, while minimal detrimental effects to the aesthetic qualities of the coating system are realized. Further, use of the specific aminoplasts minimizes problems associated with high viscosity of aminoplasts having a high content of imino groups of greater than 10%.

DETAILED DESCRIPTION OF THE INVENTION

The present invention provides a coating composition and a coating system including a clear coat layer and, optionally, at least one sub-clear coat layer. The coating system is useful for applications in which glass is bonded to a substrate, such as a vehicle body, through the coating system. More specifically, the coating system is useful in applications in which the glass is bonded to the substrate through a sealant that is included as part of the coating system. The coating composition and the coating system make it possible to achieve threshold adhesion strength, in accordance with MVSS 212, between the glass and the substrate bonded through the coating system. However, it is to be appreciated that the coating composition and coating system of the present invention are useful in the coatings industry in general and are not limited to the specific application of bonding glass to substrates.

The coating composition includes a crosslinkable carbamate-functional resin. Crosslinkable carbamate-functional resins are known in the art and are especially useful in coating compositions that are used to form clear coat layers in coating systems on vehicle bodies due excellent physical properties that are provided by the crosslinkable carbamate-functional resins upon cure. The crosslinkable carbamate-functional resin typically comprises a crosslinkable carbamate-functional polymer; however, it is to be appreciated that other non-polymeric carbamate-functional molecules may also be include with or in place of the crosslinkable carbamate-functional polymer in the crosslinkable carbamate-functional resin. Additionally, other functionality, besides carbamate functionality, may be included in the coating composition, and the other functionality may be introduced through materials other than the crosslinkable carbamate-functional resin or may be introduced as additional functional groups in the crosslinkable carbamate-functional resin. For example, crosslinkable resins other than the crosslinkable carbamate-functional resins, such as other film-forming active hydrogen-containing resins, can also be included in the coating composition in combination with the crosslinkable carbamate-functional resin. Film-forming active hydrogen-containing resins are known in the art.

Any known formulation including a crosslinkable carbamate-functional resin, especially those known to be used for forming clear coat layers, may be used for purposes of the present invention. Specific examples of suitable formulations including crosslinkable carbamate-functional resins include formulations disclosed in U.S. Pat. No. 5,356,669 to Rehfuss et al., U.S. Pat. No. 5,639,828 to Briggs et al., U.S. Pat. No. 5,814,410 to Singer et al., U.S. Pat. No. 5,976,615 to Menovcik et al., U.S. Pat. No. 5,989,642 to Singer et al., and U.S. Pat. No. 6,103,816 to Swarup et al., which are hereby incorporated by reference in their entirety.

The coating composition further comprises an aminoplast, which crosslinks with the crosslinkable carbamate-functional resin upon cure of the coating composition. As used herein, "aminoplast" or "specific aminoplast" refers to the specific aminoplast described as follows. The aminoplast comprises the reaction product of an aldehyde and a melamine. Melamine, as known in the art, generally has the following structure:

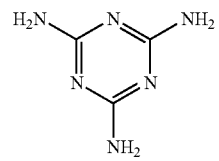

where each nitrogen-bonded hydrogen atom, i.e., imino group, represents a reaction site that is available for further reaction with functionality of other materials prior to or after reaction with the crosslinkable carbamate-functional resin. For example, as set forth above, the aminoplast comprises the reaction product of the aldehyde and the melamine. The aldehyde reacts with the aminoplast at an imino group to produce a nitrogen-bonded alkylol group pending from the triazine ring. As described in further detail below, the nitrogen-bonded alkylol groups may be further reacted with an alcohol to alkylate the nitrogen-bonded alkylol groups. Examples of suitable aldehydes, for purposes of the present invention, include those resulting in a $C_1$ to $C_8$ alcohol group bonded to a nitrogen atom pending from the triazene ring, which $C_1$ to $C_8$ alcohol group takes the place of a nitrogen-bonded hydrogen atom. Specific examples of suitable aldehydes include, but are not limited to, formaldehyde, acetaldehyde, propaldehyde, butyraldehyde, and combinations thereof.

The aldehyde and the melamine are typically reacted at a stoichiometric ratio of aldehyde to melamine of from about 5.4:1 to about 6:1, alternatively from about 5.7:1 to about 6:1, alternatively from about 5.9:1 to 6:1. Stated differently, the reactive sites in the melamine, i.e., the imino groups, can be either partially or completed reacted as a result of reaction of the aldehyde and the melamine. Theoretically, a ratio of aldehyde to melamine of 5.4:1 should result in a content of alkylol groups in the aminoplast, after reaction of the aldehyde and the melamine but prior to any further reaction such as with alcohol, of about 90%, based on the total number of reactive sites present in the melamine prior to reaction. Likewise, a ratio of aldehyde to melamine of 5.7:1 should result in a content of alkylol groups of about 95%, a ratio of aldehyde to melamine of 5.9:1 should result in a content of alkylol groups of about 99%, and a ratio of aldehyde to melamine of 6:1 should result in a content of alkylol groups in the aminoplast, of about 100%, all prior to any further reaction such as with alcohol and all based on the total number of reactive sites present in the melamine prior to reaction. The reactive sites from the melamine that are unreacted after reaction of the aldehyde and the melamine remain as imino groups in the aminoplast. Thus, the aminoplast resulting from the reaction of the aldehyde and the melamine has a content of imino groups of less than or equal to about 10% (corresponding the a ratio of aldehyde to melamine of about 5.4:1), alternatively less than about 5% (corresponding the a ratio of aldehyde to melamine of about 5.7:1), alternatively less than about 1%

(corresponding the a ratio of aldehyde to melamine of about 5.9:1), based on the total number of reactive sites present in the melamine prior to reaction. Specific methods of making the aminoplasts are known in the art. The benefits of including the specific aminoplast described herein in the coating composition are described in further detail below.

As alluded to above, at least some of the alkylol groups present in the aminoplast may be alkylated through further reaction of the aminoplast and an alcohol to produce nitrogen-bonded alkoxyalkyl groups. In particular, the hydroxyl groups in the nitrogen-bonded alkylol groups react with the alcohol through an etherification reaction to produce nitrogen-bonded alkoxyalkyl groups. The alkoxyalkyl groups are available for further reaction with, for example, the carbamate functionality of the crosslinkable carbamate-functional resin. The remaining imino groups present in the aminoplast after the aldehyde/melamine reaction are unreactive with the alcohol used for alkylation. Some of the remaining imino groups may react with the hydroxyl group in a nitrogen-bonded alkylol group from another melamine to form a bridge unit; however, most of the remaining imino groups remain unreacted in the aminoplast. Suitable alcohols that may be used to alkylate the aminoplast include $C_1$ to $C_8$ alcohols such as, for example, methanol, ethanol, propanol, butanol, etc.

When the aminoplasts are alkylated, the alkylol groups in the aminoplast may be partially alkylated. By "partially alkylated", it is meant that a sufficiently low amount of alcohol is reacted with the aminoplast to leave some of the alkylol groups in the aminoplast, under reaction conditions that should result in incomplete alkylation of the alkylol groups. When the aminoplast is partially alkylated, the aminoplast is typically alkylated with alcohol in amounts sufficient to leave alkylol groups present in the aminoplast in an amount of at least about 7%, alternatively from about 10% to about 50%, alternatively from about 15% to about 40%, based on the total number of reactive sites present in the melamine prior to reaction. Typically, the aminoplast is partially alkylated to obtain from about 40 to about 93% of alkoxyalkyl groups, alternatively from about 50% to about 90%, alternatively from about to about 60% to about 75%, based on the total number of reactive sites present in the melamine prior to reaction. Thus, when partially alkylated, the aminoplast is typically alkylated with alcohol in a stoichiometric amount of hydroxyl groups in the alcohol to alkylol groups in the aminoplast of from about 0.5:1.0 to about 0.93:1.0, alternatively from about 0.60:1.0 to about 0.9:1.0, alternatively from about 0.6:1 to about 0.85:1.0. The partially alkylated aminoplasts may have advantages over the fully alkylated aminoplasts in terms of achieving threshold adhesion strength between the glass and substrates, as illustrated by the Examples below.

The aminoplast, after alkylation, has a content of alkylol groups of at least about 7%, alternatively from about 10% to about 50%, alternatively from about 15% to about 40%, based on a total number of reactive sites present in the melamine prior to reaction. The aminoplast also has a content of imino groups of less than or equal to about 10%, alternatively less than or equal to about 5% alternatively less than or equal to about 1%, based on a total number of reactive sites present in the melamine prior to reaction. The remainder of the groups in the aminoplast, if any, are alkoxyalkyl groups.

Use of the specific aminoplast including the amounts of imino groups and alkylol or alkoxyalkyl groups provides many advantages. In particular, while aminoplasts having higher imino group content than the aminoplasts described herein typically enable threshold adhesion strength to be achieved between the glass and the substrate, it has been difficult to achieve an acceptable balance between viscosity, VOC levels, and solids levels when such aminoplasts are used. The specific aminoplasts described herein avoid the problems associated with aminoplasts having higher imino content, while still achieving threshold adhesion strength when the specific aminoplasts are used in coating systems through which glass and substrates are bonded.

It is to be appreciated that the coating composition can also include crosslinking agents other than the specific aminoplast set forth above. Suitable "other" crosslinking agents that may be present in the coating composition, besides the specific aminoplast set forth above, include active hydrogen acceptor groups. Examples of crosslinking agents that include the active hydrogen acceptor groups, for purposes of the present invention, include other aminoplasts that are different from those described above, urea resins, polyanhydrides, phenol/formaldehyde adducts, polysiloxanes, and combinations thereof. The other aminoplasts may comprise the reaction product of the aldehyde with an activated amine with or without additional alkylation. Non-limiting examples of activated amines are amines connected to aromatic rings, such as benzene, melamine, and benzoguanamine; primary carbamates; urea; amides; vinyl amines; and combinations thereof. Examples of aminoplasts include melamine-formaldehyde resins and urea formaldehyde resins. It is to be appreciated that when the "other" crosslinking agent is a melamine-formaldehyde resin, that it is distinguishable from the specific aminoplast set forth above in terms of the amount of imino groups and alkylol or alkoxyalkyl groups. When active hydrogen-containing resins are used in addition to the crosslinkable carbamate-functional resins, isocyanates may also be used as the "other" crosslinking agents for forming urethane bonds. The isocyanates may be blocked or unblocked. Additional detail with regard to suitable "other" crosslinking agents that are suitable for purposes of the present invention are disclosed in U.S. Pat. No. 5,356,669 to Rehfuss et al., U.S. Pat. No. 5,639,828 to Briggs et al., U.S. Pat. No. 5,814,410 to Singer et al., U.S. Pat. No. 5,976,615 to Menovcik et al., U.S. Pat. No. 5,989,642 to Singer et al., and U.S. Pat. No. 6,103,816 to Swarup et al.

The crosslinkable carbamate-functional resin and the specific aminoplast set forth above are typically present in the coating composition in an amount sufficient to produce urethane bonds resulting from carbamate cure with aminoplast in an amount of at least about 10%, alternatively from about 50% to about 100%, based on a total crosslink density after curing of the coating composition. Those of skill in the art appreciate that actual amounts of the crosslinkable carbamate-functional resin and the aminoplast in the coating composition, as a percentage of total weight of the coating composition, may vary depending upon numbers of carbamate groups in the crosslinkable carbamate-functional resin, among other factors such as molecular weight of the crosslinkable carbamate-functional resin and the aminoplast. However, the crosslinkable carbamate-functional resin is typically present in the coating composition in an amount of at least about 10% by weight, alternatively from about 40% to about 90% by weight, based on the total weight of the coating composition. Further, the crosslinkable carbamate-functional resin is typically present in an amount of at least about 12% by weight, alternatively from about 50% to about 100% by weight based on the total amount of all crosslinkable resins present in the coating system. Likewise, the specific aminoplast set forth above is typically present in the coating composition in an amount of at least about 10% by weight based on the total weight of the coating composition. When the other crosslinking agents are present in the coating composition, the specific aminoplast set forth above is typically present in an amount of at least about 50% by weight, more typically from about 70% to about 100% by weight based on the total amount of all crosslinking agents present in the coating composition.

Preferably, a component that includes one or more epoxide groups is included in the coating composition prior to curing of the coating composition. The component including the epoxide group essentially provides a protected hydroxyl group in the form of an epoxy ring, which becomes available for reaction upon opening of the ring. When the coating composition is used to form the clear coat layer, the protected hydroxyl group, made available upon ring-opening, is typically intended to provide a reaction site within the clear coat layer for reacting with isocyanate that is used to form the sealant, as described in further detail below.

The component including the epoxide group typically reacts more slowly than the crosslinkable carbamate-functional resins, i.e., slower than the reaction between the crosslinkable carbamate-functional resin, any other crosslinkable resin, the aminoplast, and any other crosslinking agents; however, it is to be appreciated that, in some circumstances, the component including the epoxide group may react with one or more of the crosslinkable carbamate-functional resin, any other crosslinkable resin, the aminoplast, and any other crosslinking agents. Thus, although essentially any component including an epoxide group can be used in the practice of the present invention, the component including the epoxide group is preferably substantially free of groups that are reactive with any other component in the coating composition. By 'substantially free' of such groups, it is meant that the degree of reaction between any component in the coating composition and any reactive component on the epoxide group is sufficiently low so as to avoid any undesired adverse impact on intercoat adhesion properties of the coating system. Undesired adverse impacts are typically avoided when the component including the epoxide group has an average of less than about 2 groups per molecule that are reactive with the crosslinkable carbamate-functional resin, the other crosslinkable resins, the specific aminoplast, or the other crosslinking agents. Because the component including the epoxide group is typically intended to provide a reaction site within the clear coat layer for reacting with isocyanate that is used to form the sealant, the component including the epoxide group preferably migrates within the clear coat layer and localizes near a surface of the clear coat layer. By minimizing or eliminating groups on the component including the epoxide that react directly with the crosslinkable carbamate-functional resin, the other crosslinkable resins, the specific aminoplast, or the other crosslinking agents, this migration is allowed during the early stages of cure. Later during the cure, the epoxide groups typically react to form hydroxyl groups that may be available for reaction with the sealant. The component including the epoxide group may further include a fatty chain that promotes migration of the component including the epoxide group within the clear coat layer so that the component including the epoxide may localize near a surface of the clear coat layer. The fatty chain typically has from about 1 to about 25 carbon atoms present therein.

Components including the epoxide group that are suitable for purposes of the present invention are known in the art. The component including the epoxide group may be of the general formula:

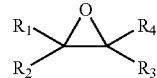

where $R_1$, $R_2$, $R_3$, and $R_4$ are each independently H, an organic radical, which may be polymeric or non-polymeric and may contain unsaturation and/or heteroatoms, or one of $R_1$ or $R_2$ together with one of $R_3$ or $R_4$ may form a cyclic ring, which may contain unsaturation and/or heteroatoms, with the proviso that at least one of $R_1$-$R_4$ is other than H. Useful components including the epoxide group can be prepared from alcohols, e.g., butanol or trimethylol propane, by reaction with an epihalohydrin (e.g., epichlorohydrin), or by reaction of an allyl group with peroxide. Oligomeric or polymeric polyepoxide groups, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Components including the epoxide group can also be prepared by reacting an isocyanate-terminated component such as a monomeric, polymeric, or oligomeric polyisocyanate with glycidol. Other known polyepoxide groups, e.g., epoxy-novolacs, may also be used. Especially suitable for purposes of the present invention are fatty glycidyl methacrylates, which include a fatty chain that enables the fatty glycidyl methacrylate to migrate within and localize at the surface of the clear coat layer. The component including the epoxide group is preferably used in amount of from about 0.0001 to about 0.05 equivalents of epoxy per 100 g of the crosslinkable carbamate-functional resin.

It is to be appreciated that other components may also be included in the coating composition of the present invention, and the coating composition of the present invention is not limited solely to the components described above. Such other components are known in the art.

As set forth above, the coating systems of the present invention include the clear coat layer and, optionally, at least one sub-clear coat layer. The at least one sub-clear coat layer may include a base coat layer, a primer layer, and/or any other sub-clear coat layer that is known in the art. In one embodiment, the coating system may include the sealant, the clear coat layer, and the sub-clear coat layer(s). In another embodiment, the coating system may only include the clear coat layer and, optionally, the sub-clear coat layer(s). For example, when the coating system is used on a vehicle body, the coating system typically includes the sealant at locations where there is a desire to bond glass to the vehicle body. However, at other locations on the vehicle body where there is no desire to bond glass thereto, the sealant may be absent from the coating system. Further, in other applications, the coating system may include the clear coat layer alone.

The clear coat layer comprises the reaction product of the crosslinkable carbamate-functional resin and the specific aminoplast set forth above, i.e., the aminoplast comprising the reaction product of the aldehyde and the melamine, wherein the aminoplast has the above-specified content of imino groups, alkylol groups, and alkoxyalkyl groups. Stated differently, the clear coat layer is typically formed from the coating composition that is described in detail above. Thus, it is to be appreciated that the clear coat layer may further comprise the reaction product of the other crosslinkable resins or other crosslinking agents that are also set forth above.

The clear coat layer formed from the crosslinkable carbamate-functional resin and the specific aminoplast includes at least some crosslinks resulting from carbamate cure with the aminoplast. Typically, at least about 10% of a total crosslink density within the clear coat layer is urethane bonds resulting from carbamate cure with aminoplast. It is to be appreciated that other specific crosslinking agents set forth above may also be included with the aminoplast, and urethane bonds resulting from carbamate cure with the other crosslinking agents may form the balance of the crosslink density in the clear coat layer. Alternatively, other types of crosslinks, besides urethane resulting from carbamate cure with aminoplast, may form a portion of the crosslink density in the clear coat layer.

The at least one sub-clear coat layer comprises the reaction product of a sub-clear coat resin and a second crosslinking agent. The at least one sub-clear coat layer is typically selected from the group of base coat layers, primer layers, and combinations thereof. In one embodiment, when the at least one sub-clear coat layer comprises the base coat layer, the sub-clear coat resin may comprise a base coat resin that is known for use in coatings systems where the clear coat layer is formed from crosslinkable carbamate-functional resins. Further, when the at least one sub-clear coat layer includes the base coat layer, the second crosslinking agent typically includes the same specific aminoplast that is used to form the clear coat layer. However, it is to be appreciated that additional or different crosslinking agents may be included in the second crosslinking agent. In addition to, or in place of, the base coat layer, the at least one sub-clear coat layer may include the primer layer. For coating systems including more than one sub-clear coat layer, the various sub-clear coat resins and second crosslinking agents used to form each sub-clear coat layer may be the same or different. Resins and crosslinking agents that are used to form the various sub-clear coat layers, such as base coat layers and primer layers, are known in the art.

Any chemistry known in the art to be suitable for forming base coat layers, primer layers, or other sub-clear coat layers, when crosslinkable carbamate-functional resins are used to form the clear coat layer, may be used to form the base coat layer, primer layer, or other sub-clear coat layers in the coating system of the present invention. The chemistry used to form the various layers within the coating system, including the clear coat layer, may be solvent-borne or water-borne chemistry, and may alternatively be applied in the form of a powder or a powder/slurry. Typically, the chemistry is solvent-borne chemistry due to the fact that solids content of coating compositions tends to be an issue in such chemistry, and aminoplasts having high imino content of greater than 10% are especially difficult to use with such chemistry due to high viscosity that is associated with such aminoplasts.

The clear coat layer and the sub-clear coat layer(s) are typically formed wet-on-wet on the substrate. For example, the primer layer is typically formed on the substrate, the base coat layer is formed on the primer layer prior to complete curing of the primer layer, i.e., while the primer layer is still wet, and the clear coat layer is typically formed on the base coat layer prior to complete curing of the primer layer and the base coat layer, i.e., while both the primer layer and the base coat layer are still wet. Once each of the layers is in place, the layers are then completely cured through methods that are known in the art.

The sealant is typically formed on the clear coat layer after the clear coat layer and the base coat layer, when present, have been completely cured. However, in some instances, the sealant may be formed on the base coat layer, such as in situations wherein out-of-spec film builds of the clear coat layer occur. Alternatively, in some instances, the sealant may also be formed on the clear coat layer prior to complete curing of the clear coat layer.

Sealants are well known in the art. Sealants that are suitable for purposes of the present invention include those comprising the water-activated reaction product of an isocyanate component and an isocyanate-reactive component. For purposes of the present invention, any isocyanate known in the art for forming polyurethane, such as typical diisocyanates, is suitable for the isocyanate component of the sealant component. Also for purposes of the present invention, the isocyanate-reactive component typically comprises a polyamine, i.e., a component having an average of at least 2 amine groups per molecule. Water is used to activate the reaction between the isocyanate component and the isocyanate-reactive component by reacting with the isocyanate component. The amount of water required for activation is typically provided by moisture in the ambient air surrounding the sealant; however, the water may be introduced through the isocyanate-reactive component or may be combined with the isocyanate component and/or the isocyanate-reactive component during reaction of the isocyanate component and the isocyanate-reactive component. A specific example of a sealant that is suitable for purposes of the present invention is Betaseal 57302 urethane windshield adhesive commercially available from Dow Automotive.

Glass is bonded to the substrate through the coating system and, in particular, through the sealant in the coating system to form an article in accordance with the present invention. Threshold adhesion strength may be achieved between the glass and the substrate through the coating system including the sealant, the clear coat layer, and, optionally, the sub-clear coat layer(s), especially when the specific aminoplast is included in the coating system. By threshold adhesion strength, it is meant adhesion between the glass and the substrate that satisfies MVSS 212. The threshold adhesion strength is typically achieved at a thickness of the clear coat layer of at least 0.7 mils. Notably, the threshold adhesion strength may be achieved in the absence of a reactive primer applied between the sealant and the clear coat layer. Such systems are commonly referred to in the art as primerless systems, and MVSS adhesion that is achieved without the use of such primers is commonly referred to as primerless MVSS adhesion. In laboratory studies, plaques are typically prepared including the coating system with the sealant, the clear coat layer, and the base coat layer. The clear coat layer is formed in a wedge of gradually decreasing thickness. Adhesion strength between glass and the sealant is typically known, and it is the adhesion between the sealant and the clear coat layer that is typically the weakest point in the bond between the glass and the substrate. Therefore, the bond between the sealant and the clear coat layer is tested by pulling the sealant from the clear coat layer and observing the thickness of the clear coat layer at a point where the sealant can no longer be manually pulled from the clear coat layer, which is deemed a "minimum passing thickness". Lower minimum passing thicknesses of the clear coat layer correlate to better adhesion strength between the sealant and the clear coat layer, with threshold adhesion strength typically achieved when the sealant can no longer be manually pulled from the clear coat layer at a thickness of the clear coat layer of about 0.8 mils. Although the targeted clear coat layer thickness is 2.0 mils, it is desirable that adequate adhesion strength is achieved as low as 0.5 mil of clear coat. Although the targeted sub-basecoat thickness is 0.5-1.0 mil, it is desirable that adequate adhesion strength is achieved as high as 2.0 mils of basecoat. It is most desirable when adequate adhesion strength is achieved with 2.0 mils of the sub-clear coat layer and 0.5 mil of the clear coat layer.

The following examples are meant to illustrate, and not to limit, the present invention.

EXAMPLES

Coating systems can be prepared including a clear coat layer and a base coat layer on a primed steel panel for purposes of illustrating adhesion between the clear coat layer and the sealant within the coating system. The base coat compositions used was based on a blue metallic high solids solvent borne base coat. A specific base coat composition that was used to form the base coat layer in the following examples is summarized in Table 1 below. All amounts are in percent by weight based on the total weight of the respective base coat composition unless otherwise indicated.

TABLE 1

| Component | Base Coat 1 | Base Coat 2 |
|---|---|---|
| Emulsion Type Microgel | 23.5 | 23.5 |
| N-Methyl Pyrrolidone | 1.1 | 1.1 |
| Pentyl Proprionate | 2.2 | 2.2 |
| Amino Methyl Propanol | 0.2 | 0.2 |
| First Aminoplast | 17.4 | 0.0 |
| Second Aminoplast | 0.0 | 17.4 |
| Polybutyl Acrylate | 0.1 | 0.1 |
| UVA Solution A | 2.7 | 2.7 |
| Barium Sulphate Dispersion | 6.0 | 6.0 |
| Fumed Silica Dispersion | 4.5 | 4.5 |
| Carbon Black Dispersion | 1.6 | 1.6 |
| Cinquasia Violet Dispersion | 3.8 | 3.8 |
| Palomar Blue Dispersion | 13.9 | 13.9 |
| Hydroxy-Functional Acrylic Resin | 7.5 | 7.5 |
| CAB Solution | 4.1 | 4.1 |
| 25% DDBSA Solution Blocked With Amine | 1.8 | 1.8 |
| Isopropanol | 1.1 | 1.1 |
| Blue Mica Slurry | 5.9 | 5.9 |
| Red Mica Slurry | 1.6 | 1.6 |
| Ethanol | 0.5 | 0.5 |
| Butyl Acetate | 0.5 | 0.5 |
| TOTAL | 100.0 | 100.0 |

First aminoplast has about less than 1% imino groups, about 4% methylol groups, and about 95% of a combination of butoxymethyl groups and methoxymethyl groups, with the percentage of groups based on a total number of reactive sites present in the melamine prior to formation of the aminoplast. The first aminoplast is commercially available from Ineos of St. Louis, Mo.

Second aminoplast has about less than 1% imino groups and about 17% methylol groups, with the percentage of groups based on a total number of reactive sites present in the melamine prior to formation of the aminoplast, and with about 83% of the methylol groups methylated with methanol. The second aminoplast is commercially available from Cytec Industries, Inc. of West Paterson, N.J.

UVA Solution A is Tinuvin 400® commercially available from Ciba Specialty Chemicals of Tarrytown, N.Y.

Specific clear coat compositions that can be used to form the clear coat layer in the following examples are described in U.S. Pat. No. 5,639,828, modified by inclusion of the specific aminoplasts in accordance with the instant invention, and are summarized in Table 2 below.

TABLE 2

| Component | Clear Coat 1 | Clear Coat 2 |
|---|---|---|
| UVA Solution B | 5.5 | 5.5 |
| 70% by Weight Carbamated Acrylic Resin in amyl acetate | 26.8 | 26.8 |
| 28% by Weight Carbamated Polyurethane/27% by Volume Carbamated Diol in a blend of solvents | 9.4 | 9.4 |
| 38% by Weight Carbamated Polyurethane in a blend of solvents | 11.7 | 11.7 |
| Second Aminoplast | 0.0 | 10.7 |
| Third Aminoplast | 10.7 | 0.0 |
| Hydroxyl Acrylic Resin | 9.0 | 9.0 |
| Fumed Silica Dispersed in Carbamated Acrylic Resin | 15.0 | 15.0 |
| Epoxy-Functional Acrylic Polymer | 1.7 | 1.7 |
| Isobutanol | 3.2 | 3.2 |
| Primary Amyl Acetate | 2.2 | 2.2 |
| BYK-405 | 0.2 | 0.2 |
| 60% by Weight Solution of Polybutyl Acrylate in solvent | 0.1 | 0.1 |
| Hindered Amine Light Stabilizer | 0.5 | 0.5 |
| Alkyl Tin Catalyst | 0.2 | 0.2 |
| UVA Solution A | 0.9 | 0.9 |
| Octanoic Acid | 0.3 | 0.3 |
| 25% by Weight Solution of DDBSA Blocked With Amine in solvent | 2.2 | 2.2 |
| 70% by Weight Solution of DDBSA in solvent | 0.4 | 0.4 |
| TOTAL | 100.0 | 100.0 |

UVA Solution B is a 30% by weight solution of Tinuvin® 928 commercially available from Ciba Specialty Chemicals of Tarrytown, N.Y.

The third aminoplast comprises less than about 1% imino groups, about 6% methylol groups, and about 93%% methylmethoxy groups with the percentage of groups based on a total number of reactive sites present in the melamine prior to formation of the aminoplast. The third aminoplast is commercially available from Cytec Industries, Inc.

To prepare the coating systems, a base coat composition is applied to the primed steel panel to form a base coat layer having a thickness of 1.5 mils dry film thickness and flashed for at least 5 minutes at room temperature before applying a clear coat composition onto the base coat layer. The clear coat composition is applied to the base coat layer in a wedge to form a clear coat layer having a thickness of from 0.1 to 2.0 mils dry film thickness. The clear coat layer and the base coat layer are then flashed for a period of at least 10 minutes at room temperature, and baked in an oven for 10 minutes at 275° F. metal temperature of the steel panel.

After removing the panels including the base coat layer and the clear coat layer from the oven, the panels are allowed to age overnight before applying the sealant, which is Betaseal 57302 urethane windshield adhesive commercially available from Dow Automotive. A bead of the sealant is applied along the direction of the clear coat wedge. The sealant is the allowed to cure for 72 hours at 50% RH and 75° F. After curing, the sealant is pulled from the panel. The sealant has weak adhesion at low clear coat film builds, and at some point along the wedge of clear coat thickness, good adhesion is achieved. Good adhesion, as used herein, is adhesion that is high enough such that the sealant can no longer be manually pulled from the panel without tearing. The minimum clear coat thickness required to achieve good adhesion is recorded and is set forth below in Table 3, with lower values for the thickness of the clear coat layer indicating better adhesion.

TABLE 3

| Base coat composition | Clear coat composition | Minimum clear coat film thickness to achieve threshold adhesion strength, mm |
|---|---|---|
| 1 | 1 | 1.3 |
| 2 | 1 | 1.2 |
| 1 | 2 | 0.9 |
| 2 | 2 | 0.7 |

As is apparent from the above table, lower minimum clear coat film thickness to achieve threshold adhesion strength is achieved when compositions in accordance with the present invention, including the specified aminoplasts, are used for either the base coat composition or for the clear coat composition, and the lowest minimum clear coat film thickness to achieve threshold adhesion strength is achieved when compositions in accordance with the present invention, including the specified aminoplasts, are used for both the clear coat composition and the base coat composition. Thus, the Examples clearly illustrate the effect of the specific aminoplasts used in the compositions of the present invention on minimum clear coat thickness to achieve threshold adhesion strength between the coating system and the sealant.

The invention has been described in an illustrative manner, and it is to be appreciated that the terminology which has been used is intended to be in the nature of words of description rather than of limitation. Obviously, many modifications and variations of the present invention are possible in view of the above teachings. It is, therefore, to be appreciated that within the scope of the claims the invention may be practiced otherwise than as specifically described.

What is claimed is:

1. A coating composition comprising:
   a crosslinkable carbamate-functional resin; and
   an aminoplast comprising the reaction product of an aldehyde and a melamine;
   wherein said aminoplast has a content of imino groups of less than or equal to about 10%, a content of alkylol groups of at least about 15%, and a remainder of groups being alkoxyalkyl groups, all based on a total number of reactive sites present in the melamine prior to reaction.

2. A coating composition as set forth in claim 1 wherein said aminoplast has a content of imino groups of less than about 5% based on the total number of reactive sites present in the melamine prior to reaction.

3. A coating composition as set forth in claim 1 wherein said aminoplast comprises alkoxyalkyl groups in an amount of from about 40% to about 85% based on a total number of reactive sites present in the melamine prior to reaction.

4. A coating composition as set forth in claim 1 wherein said crosslinkable carbamate-functional resin and said aminoplast are present in an amount sufficient to produce urethane bonds resulting from carbamate cure with aminoplast in an amount of at least about 10% based on a total crosslink density after curing of said coating composition.

5. A coating composition as set forth in claim 1 wherein said coating composition further comprises a component including at least one epoxide group.

6. A coating composition as set forth in claim 5 wherein said component including at least one epoxide group is substantially free of groups that are reactive with said crosslinkable carbamate-functional resin and said aminoplast.

7. A coating composition as set forth in claim 5 wherein said component including at least one epoxide group further comprises a fatty chain having from about 1 to about 25 carbon atoms.

8. A coating system comprising:
   a clear coat layer comprising:
      the reaction product of:
         a crosslinkable carbamate-functional resin; and
         an aminoplast comprising the reaction product of an aldehyde and a melamine;
         wherein the aminoplast has a content of imino groups of less than or equal to about 10%, a content of alkylol groups of at least about 15%, and a remainder of groups being alkoxyalkyl groups, all based on a total number of reactive sites present in the melamine prior to reaction; and
   optionally, at least one sub-clearcoat layer comprising the reaction product of a sub-clear coat resin and a second crosslinking agent.

9. A coating system as set forth in claim 8 wherein the aminoplast has a content of imino groups of less than about 5% based on the total number of reactive sites present in the melamine prior to reaction.

10. A coating system as set forth in claim 8 wherein the aminoplast has a content of alkoxyalkyl groups of from about 40% to about 85% based on the total number of reactive sites present in the melamine prior to reaction.

11. A coating system as set forth in claim 8 comprising said at least one sub-clear coat layer.

12. A coating system as set forth in claim 11 wherein the second crosslinking agent comprises the aminoplast.

13. A coating system as set forth in claim 11 wherein said at least one sub-clear coat layer is selected from the group of a base coat layer, a primer layer, and combinations thereof.

14. A coating system as set forth in claim 8 wherein the crosslinkable carbamate-functional resin and the aminoplast are reacted in an amount sufficient to produce urethane bonds resulting from carbamate cure with aminoplast in an amount of at least about 10% based on a total crosslink density in said clear coat layer.

15. A coating system as set forth in claim 8 wherein said clear coat layer further comprises a component including at least one epoxide group.

16. A coating system as set forth in claim 15 wherein the component including at least one epoxide group is substantially free of groups that are reactive with the crosslinkable carbamate-functional resin and the aminoplast.

17. A coating system as set forth in claim 15 wherein the component including at least one epoxide group further comprises a fatty chain having from about 1 to about 25 carbon atoms.

18. A coating system as set forth in claim 8 further defined as a wet on wet system wherein said clear coat layer is formed on said at least one sub-clear coat layer prior to complete curing of said at least one sub-clear coat layer.

19. A coating system as set forth in claim 8 further comprising a sealant disposed upon said clear coat layer.

20. A coating system as set forth in claim 19 wherein said clear coat layer and said at least one sub-clear coat layer are completely cured prior to forming said sealant upon said clear coat layer.

21. A coating system as set forth in claim 19 wherein said sealant comprises the reaction product of an isocyanate component and an isocyanate-reactive component.

22. A coating system as set forth in claim 21 free of a reactive primer disposed between said clear coat layer and said sealant.

23. An article comprising a substrate bonded to said coating system opposite said sealant of said coating system set forth in claim 22.

24. An article as set forth in claim 23 further comprising glass bonded to said sealant.

25. An article as set forth in claim 22 having threshold adhesion strength between said glass and said substrate at a thickness of said clear coat layer of less than or equal to about 0.8 mils.

* * * * *